United States Patent
Cai et al.

(10) Patent No.: US 10,839,979 B2
(45) Date of Patent: Nov. 17, 2020

(54) CABLE WITH FLAME RETARDANT MULTI-LAYER COVERING

(71) Applicant: TEKNOR APEX COMPANY, Pawtucket, RI (US)

(72) Inventors: Kevin Cai, Cumberland, RI (US); Kushal Bahl, Providence, RI (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 123 days.

(21) Appl. No.: 15/641,726

(22) Filed: Jul. 5, 2017

(65) Prior Publication Data

US 2018/0012678 A1     Jan. 11, 2018

Related U.S. Application Data

(60) Provisional application No. 62/359,945, filed on Jul. 8, 2016.

(51) Int. Cl.
| | |
|---|---|
| *H01B 3/44* | (2006.01) |
| *C08K 5/52* | (2006.01) |
| *C09K 21/12* | (2006.01) |
| *C08L 53/02* | (2006.01) |
| *C08K 5/00* | (2006.01) |

(52) U.S. Cl.
CPC ........... *H01B 3/442* (2013.01); *C08K 5/0066* (2013.01); *C08K 5/5205* (2013.01); *C08L 53/02* (2013.01); *C09K 21/12* (2013.01)

(58) Field of Classification Search
None
See application file for complete search history.

(56) References Cited

U.S. PATENT DOCUMENTS

| | | | | |
|---|---|---|---|---|
| 5,563,217 A | * | 10/1996 | Davis | ........................ B32B 3/06 525/194 |
| 6,178,277 B1 | | 1/2001 | Ravela et al. | |
| 9,156,978 B1 | | 10/2015 | Cai et al. | |

(Continued)

FOREIGN PATENT DOCUMENTS

| | | |
|---|---|---|
| DE | 4332914 A1 | 3/1995 |
| EP | 0976783 A1 * | 2/2000 .............. C08L 23/16 |

(Continued)

OTHER PUBLICATIONS

Gjerning, Testing for Flame Resistance of Electrical Cables, Northwire Inc. Publication, Oct. 2010, 2 pages.

*Primary Examiner* — Callie E Shosho
*Assistant Examiner* — Patrick N English
(74) *Attorney, Agent, or Firm* — Hudak, Shunk & Farine Co. LPA (57) ABSTRACT

A cable comprising a covering having two or more different sheath layers, with the covering providing superior chemical and weathering resistance, and excellent surface feel. In a preferred embodiment, the outermost sheath layer of the covering is a thermoplastic elastomer essentially free of a flame retardant material, yet the covering achieves desirable flame retardant performance due to the presence of an inner sheath layer comprising a thermoplastic elastomer and a flame retardant, preferably halogen-free flame retardant. The outermost sheath layer also exhibits sought-after surface qualities. Methods for producing the coverings and flame retardant cables are disclosed.

19 Claims, 1 Drawing Sheet

(56) References Cited

U.S. PATENT DOCUMENTS

| | | | |
|---|---|---|---|
| 2003/0176582 A1* | 9/2003 | Bening | C08F 287/00 |
| | | | 525/242 |
| 2004/0147675 A1* | 7/2004 | Hofmann | C08L 29/14 |
| | | | 525/165 |
| 2007/0221395 A1* | 9/2007 | Hase | H01B 3/441 |
| | | | 174/120 SR |
| 2010/0307822 A1* | 12/2010 | Schmidt | H01B 3/442 |
| | | | 174/74 R |
| 2013/0306350 A1 | 11/2013 | Dinkelmeyer et al. | |
| 2014/0234620 A1 | 8/2014 | Zhu et al. | |
| 2016/0152798 A1* | 6/2016 | Kamimoto | C08K 3/26 |
| | | | 524/100 |

FOREIGN PATENT DOCUMENTS

| | | | | |
|---|---|---|---|---|
| WO | WO-2015025658 A1 * | 2/2015 | | C08K 3/26 |
| WO | 2015055563 A1 | 4/2015 | | |

* cited by examiner

CABLE WITH FLAME RETARDANT MULTI-LAYER COVERING

FIELD OF THE INVENTION

The present invention relates to a cable comprising a covering having two or more different sheath layers, with the covering providing superior chemical and weathering resistance, and excellent surface feel. In a preferred embodiment, the outermost sheath layer of the covering is a thermoplastic elastomer essentially free of a flame retardant material, yet the covering achieves desirable flame retardant performance due to the presence of an inner sheath layer comprising a thermoplastic elastomer and a flame retardant, preferably halogen-free flame retardant. The outermost sheath layer also exhibits sought-after surface qualities. Methods for producing the coverings and flame retardant cables are disclosed.

BACKGROUND OF THE INVENTION

In addition to insulating or otherwise isolating a wire or group thereof from the environment, coverings such as sheaths, jackets or the like, must meet a number of other requirements, such as but not limited to, excellent extrudability, chemical resistance, weathering resistance, flame retardance, stiffness, flexibility, and good surface aesthetics such as soft touch and silky feel. These properties become especially important for cables used in consumer electronics applications.

Various compositions have been used to form coverings for wires and cables, including multiple layers having a myriad of additives and components. Example compositions are set forth in the following publications.

U.S. 2014/0234620 relates to a wire or cable comprising a flame retardant-free thermoplastic inner sheath and an outer sheath composition comprising, based on the weight of the composition, (a) 10 wt. % to 90 wt. % of a TPU based resin, (b) 5 wt. % to 90 wt. % of a metal hydrate, (c) 2 wt. % to 50 wt. % of a nitrogen-based phosphorus flame retardant, and (d) 2 wt. % to 50 wt. % liquid phosphate modifier, wherein the outer sheath is in contact with the insulation covering, and wherein the outer sheath has a thickness from greater than zero to 0.8 mm.

U.S. 2013/0306350 relates to an electrical line with a temperature resistance reportedly of at most at least 90° C. and particularly fire properties which meet the Standard UL83 (corresponds to CSA Standard 022.2 No. 75-08) and are halogen-free as a result, where the line has at least one electrical strand including a conductor and a flame retardant, temperature resistant halogen-free insulating layer surrounding the conductor. The strand is surrounded by a casing of a polyamide containing polymer mixture, particularly of polyamide. The casing rests on the insulating layer of the strand or the line has an intermediate layer which forms an intermediate casing and borders the insulating layer of at least two strands and the casing which surrounds the intermediate layer and which is also called intermediate casing.

U.S. Pat. No. 6,178,277 relates to a multi-layer reinforced and stabilized cable construction comprising a core portion and a non-metallic sheathing portion having barrier and protective layers and two or more outer reinforcement layers. In order for the mechanical and barrier properties of the cable to be controlled, the barrier and protective layers and/or the reinforcement layers are oriented in a controlled manner at different angles by fibrous reinforcements or lamellar barriers.

Certain flame retardant standards are required of wire coverings by manufacturers or end users. Relatively high amounts of flame retardants, e.g. 35 wt. %, can be necessary in some embodiments, such as when halogen-free flame retardant thermoplastic elastomer compositions are used. Halogen-free polymer systems tend to be more polar than polyolefin. A problem associated such polymer systems includes poor surface quality, e.g. rough or non-smooth surfaces, believably caused by high amounts of non-halogen flame retardants. Another problem is poor chemical resistance, due to the polymer system and halogen-free flame retardants. Still another problem is that the coverings may be stained easily by skin oil, everyday use products or common household products, which to some degree are simulated by using sebum oil. Some halogen-free flame retardant coverings formed with certain intumescent flame retardants, such as BPA-based flame retardants, can exhibit poor weathering and cause severe yellowing and undesirable color changes. These problems may make halogen-free flame retardant coverings unsuitable for consumer electronic applications.

SUMMARY OF THE INVENTION

In view of the above, the noted problems and others are solved by the present invention that provides a multi-layer covering for wire(s) that exhibits desirable flame retardant and outer surface properties.

An additional embodiment of the present invention provides a flame retardant cable having an outer sheath layer with a smooth outer surface that provides chemical and weathering resistance.

Still another embodiment of the present invention is to provide flame-retardant cable that surprisingly passes the VW-1 flame test according to UL 1581, section 1080, with the cable including an outer sheath layer that includes little to no flame retardant components, with flame retardants being provided by an inner sheath layer comprising halogen-free flame retardants.

Yet another object of the present invention is to provide a co-extruded wire covering including an inner sheath layer comprising a flame retardant preferably halogen-free, thermoplastic elastomer composition and an outer sheath layer comprising a thermoplastic elastomer and including little or no flame retardants whatsoever.

In one aspect a cable is disclosed, comprising a core comprising at least one wire; an inner sheath layer surrounding the core, the inner sheath layer comprising a styrenic block copolymer, and halogen-free flame retardants; and an outer sheath layer surrounding the inner layer, the outer sheath layer comprising a styrenic block copolymer and being essentially free of flame retardants, wherein the cable passes a VW-1 flame test according to UL 1581, section 1080.

In a further aspect a cable is disclosed, comprising a core comprising at least one wire; an inner sheath layer surrounding the core, the inner sheath layer comprising halogen-free flame retardants; and an outer sheath surrounding the inner layer, the outer sheath layer comprising a styrenic block copolymer and being essentially free of flame retardants, wherein the outer sheath has a weatherability of less than 8 $\Delta E$ at 150 $KJ/m^2$ as measured according to automotive interior weathering standard SAEJ 2412.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

The term "wire" and similar terms mean a single strand of conductive metal such as copper or a single strand of optical fiber.

The term "cable" and similar terms mean at least one wire or optical fiber within a covering, the covering comprising, for example an insulating sheath or a protective sheath. Typically a cable is two or more wires bound together, typically in a common sheath. The individual wires inside a covering may be bare, covered or insulated. Cables may contain wires that comprise both conductive metal strands and optical fibers. A cable can be used for low, medium, and/or high voltage applications.

The term "halogen-free" and similar terms mean that the composition or component referred to are without or substantially without halogen content, i.e. contain less than 2,000 mg/kg of halogen as measured by ion chromatography. Halogen content of less than this amount is considered inconsequential to the efficacy of the composition as a wire or cable covering.

The term "essentially free of" and similar terms mean that the composition or component contains less than 5 parts or 1 part, desirably less than 0.5 part and preferably less than 0.1 part per 100 total parts by weight of the composition or component.

The term "VW-1" is a flame rating of a cable that is herein determined according to the flame test set forth in UL-1581, section 1080 from UL LLC, formerly Underwriters Laboratories (UL).

Figure 1:
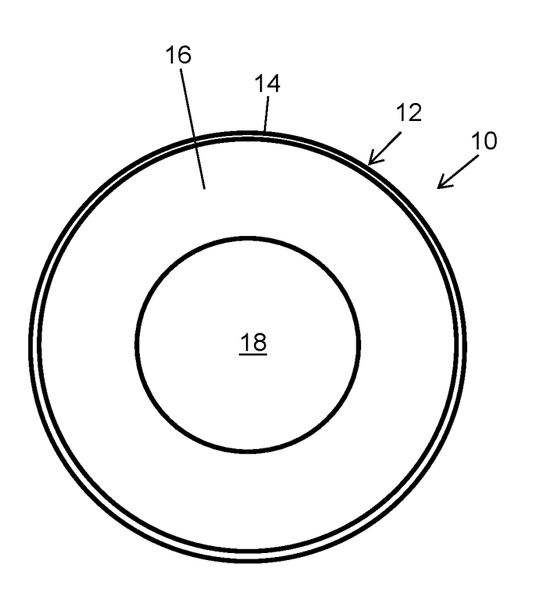
FIG. 1 illustrates a cross-sectional view of a cable including a core, an inner sheath including a flame retardant thermoplastic elastomer, and an outer sheath essentially free of flame retardants and comprising a thermoplastic elastomer that provides a silky smooth surface and desirable chemical and weathering resistance.

In accordance with the invention, FIG. 1 shows one, non-limiting embodiment of a cross-sectional view of a cable 10 including a multi-layer covering 12 including an outer sheath 14 and an inner sheath 16. The cable 10 comprises a core 18 comprising at least one wire surrounded by inner sheath 16 which is in turn surrounded by outer sheath 14. Both the inner sheath and outer sheath comprise thermoplastic elastomers in a preferred embodiment. In one embodiment, the inner sheath can comprise a halogen-containing polymer or copolymer such as poly(vinyl chloride). The inner sheath is preferably adjacent to and in contact with the outer sheath. However, the properties of the inner sheath an outer sheath differ in order to achieve the objectives of the present invention. In particular, the material of the inner sheath 16 is provided with halogen-free flame retardants that allow the cable to achieve a VW-1 flame test rating measured according to UL 1581, section 1080. In comparison, the material of the outer sheath 14 is essentially free of flame retardants and contains components that synergistically provide desirable chemical and weathering resistance and good feel.

It has been surprisingly found that, even though the outer sheath of the cable is essentially free of a flame retardant material, the cable still achieves a VW-1 rating measured according to UL 1581, section 1080 and thus meets the flame retardant standards required by certain wire and cable covering manufacturers or end users. In one embodiment, the inner sheath is extruded around the core. In a further embodiment the outer sheath is extruded around or over the inner sheath. In a preferred embodiment, the inner sheath and outer sheath are coextruded over the core. Other methods can be utilized to provide the core with an inner sheath layer and an outer sheath layer as described herein, if desired.

In order to impart the desired characteristics to the cable of the invention, the outer sheath layer has a defined thickness in relation to the total thickness of the inner sheath layer and outer sheath layer. The outer sheath layer has a minimum thickness that is utilized to provide desirable chemical and weathering resistance to the cable, as well as to provide the cable with particular surface qualities that are desired or pleasing to an end user. The outer sheath layer has a maximum thickness whereby the cable passes the VW-1 flame test according to UL-1581, section 1080. The thickness of the inner sheath layer is sufficient for the cable to pass the VW-1 flame test.

In various embodiments of the invention, the outer sheath layer has a thickness that ranges generally from about 0.5 percent to about 30 percent, desirably from about 1 to about 20 percent and preferably from about 3 to about 12 or about 15 percent based upon the total thickness of the inner sheath layer and the outer sheath layer as measured perpendicular to a line tangent to the cable at just one point or the radius of the cable when the cable is substantially cylindrical or circular in cross-section.

In a further aspect of the invention, the cable is characterized by the flame retardant properties of each sheath layer. The compositions used to form the one or more inner sheath layers pass the UL 94 VB test with a V-0 rating at a thickness of 3.175 mm (⅛ in). However, the composition used to form the outer sheath layer in various embodiments of the invention fails the UL 94 VB test at a thickness of less than or equal to 3.175 mm (⅛ in). Accordingly, it is quite surprising and unexpected that the cables according to the invention, having an outer sheath layer exposed to the environment, pass the VW-1 flame test according to UL-1581, section 1080.

The cables of the present invention have an outer sheath with a minimum weatherability in order to render the cables suitable for exposure to an intended environment and maintain a desired appearance. One means of characterizing weatherability is according to the method set forth in SAE J2412. In various embodiments of the present invention, the compositions utilized to form the outer sheath layer of the invention have a weatherability of generally less than 8 ΔE, 150 KJ/m², desirably less than 5 ΔE, 150 KJ/m², and preferably less than 3 ΔE, 150 KJ/m², as measured according to SAE J2412 with black panel temperature of 89° C. and chamber temperature of 63° C.

The cables of the present invention are also characterized by having a desirable chemical resistance. Having such chemical resistance aids in the cable's ability to resist staining upon exposure to skin oil, everyday use products, or common household products. The chemical resistance of compositions of the present invention utilized to form the outer sheath layer are characterized by the following chemical resistance procedure: Dog-bone shaped plaques of 1.905 mm (0.075 in) thickness and 6.35 mm (0.25 in) width were die cut from injection molded plaques molded at 187° C. to 221° C. (370° F.-430° F.). Using a Q-tip, the simulant was uniformly applied on the surface of the specimen. The specimens were then conditioned at 65° C. for three days. Tensile elongation at break was measured according to ASTM D412 before and after chemical exposure. Chemical resistance is quantified by % change in elongation at break of the sample. The lower the % change, the greater the chemical resistance of the specimen.

As described hereinabove, the covering comprising the inner sheath layer and outer sheath layer is thermoplastic elastomer-based. The following components can be utilized to form various sheath layers of a covering.

Thermoplastic Elastomer

General Styrenic Block Copolymers

In various embodiments, the compositions of the inner sheath layer and/or outer sheath layer include one or more styrenic block copolymers. In a preferred embodiment, the styrenic block copolymers have a hard block (A) including aromatic vinyl or mono alkenyl arene repeat units and at least one soft polymer block (B) containing two or more repeat units, that are the same or different, and independently derived from olefin monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

The number average molecular weight and distribution of any type of styrenic block copolymer (SBC) described in this application are measured by gel permeation chromatography (GPC). The SBC is dissolved in a suitable solvent, such as THF, (typically 0.001-0.010 wt. %), and an appropriate quantity is injected into a GPC device. One suitable GPC device is available from Waters of Milford, Mass. as a Waters Breeze Dual Pump LC. The GPC analysis is performed at an appropriate elution rate (1 to 10 mL/min). The molecular weight distribution is characterized by the signals from UV and refractive index detectors, and number average molecular weights are calculated using a calibration curve generated from a series of narrow molecular weight distribution polystyrenes with peak molecular weights of 500 to 1,000,000 as standard.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are aromatic vinyl compound homopolymer blocks in one embodiment. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other mono alkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

In various embodiments, the hydrogenated styrenic block copolymers including styrene or mono alkenyl arene in a soft polymer block (B) along with one or more of the olefin monomers and diene monomers have said blocks that are formed in a random manner. Non-limiting examples of styrenic block copolymers having styrene or monoalkenyl arene randomly distributed in a soft polymer block (B) are set forth in U.S. Pat. Nos. 6,031,053 and 6,197,889. Hydrogenation can be performed as known to those of ordinary skill in the art.

The soft polymer block (B) of the styrenic block copolymer includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In one embodiment, the soft polymer block does not contain any unsaturated bonds.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated or substantially hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. Therefore, in one embodiment, the soft polymer block (B) can have structural units derived from one or more of an olefin monomer(s) and diene monomer(s). As indicated hereinabove, when the soft polymer block (B) has structural units derived from three or more repeat units, the structural units may be combined in any form.

The styrenic block copolymers may be prepared utilizing bulk, solution or emulsion or other techniques as known in the art.

Optionally, the soft polymer block (B) can include small amounts of structural units derived from other copolymerizable monomers in addition to the structural units described. In this case, the proportion of the other copolymerizable monomers is generally 30% by weight or less, and preferably 10% by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

Optionally, the styrenic block copolymer can be a functionalized styrenic block copolymer such as an acid or anhydride functionalized block copolymer, such as prepared by graft reacting an acid moiety or its derivative into the styrenic block copolymer via a free radically initiated reaction. Examples of suitable monomers which may be grafted include unsaturated mono and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. Suitable functionalized styrenic block copolymers generally contain from about 0.1 to about 10 percent by weight, preferably from about 0.2 to about 5 percent by weight of the grafted monomer, based on the total weight of the styrenic block copolymer. Grafting reactions can be carried out in solution or by melt mixing the base block copolymer and the acid/anhydride monomer in the presence of a free radical initiator, such as known in the art, see for example U.S. Pat. No. 6,653,408, herein fully incorporated by reference. Suitable functionalized block copolymers are available from KRATON Polymers, Kuraray, Asahi-Kasei, BASF and the like.

In various embodiments, the styrenic block copolymers include, but are not limited to, styrene-butadiene-styrene (SBS), styrene-butadiene/butylene-styrene (SBBS), styrene-isoprene-styrene (SIS), styrene-ethylene/propylene-styrene (SEPS), styrene-ethylene/propylene (SEP), styrene-ethylene/butylene-styrene (SEBS), styrene-ethylene/ethylene/propylene-styrene (SEEPS) and styrene-isobutylene-styrene (SIBS).

Styrenic block copolymers are available in the art from sources such as Kraton Polymers of Houston, Tex., as Kraton; Kuraray Co., Ltd. of Tokyo, Japan as SEPTON™ styrenic block copolymers, LCY Chemical Industry Corp, as Globalprene®, and TSRC Corporation of Taiwan as Taipol.

The amount of the one or more styrenic block copolymers utilized in the compositions of the present invention ranges generally from about 1 to about 40 or about 45 or about 50 parts, desirably from about 10 to about 35 parts and preferably from about 10 or about 15 to about 30 parts based on 100 parts by weight of the composition.

Controlled distribution copolymer block-containing styrenic block copolymers

The controlled distribution block-containing styrenic block copolymers utilized in one or more sheath layers have at least a first block of a mono alkenyl arene, such as styrene, and a second block of a controlled distribution copolymer of diene and mono alkenyl arene. Thus, the block copolymers can be any di- or higher block copolymers. In the case of a di-block copolymer composition copolymer, one block is an alkenyl arene-based block and polymerized therewith is a second block of the controlled distribution copolymer comprising diene and alkenyl arene. Tri-block or higher multi-block copolymers include at least one alkenyl arene-based block and at least one controlled distribution copolymer block comprising diene and alkenyl arene. In one preferred embodiment, the triblock-composition comprises, as end blocks, alkenyl arene-based blocks and a mid-block of a controlled distribution copolymer comprising diene and alkenyl arene. Where a tri-block copolymer composition is prepared, the controlled distribution copolymer block can be designated as "B" and the alkenyl arene-based block designated as "A". The A-B-A tri-block compositions can be made by either sequential polymerization or coupling. In one embodiment, in the sequential solution polymerization technique, the mono alkenyl arene is first introduced to produce a relatively hard aromatic-containing block, followed by introduction of the controlled distribution diene and alkenyl arene-containing mixture to form the mid-block, and then followed by introduction of the mono alkenyl arene to form the terminal block.

In one embodiment, a method for making a controlled distribution copolymer block-containing styrenic block copolymer is set forth in U.S. Pat. No. 7,169,848 herein incorporated by reference. As utilized herein, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. Prior to hydrogenation the styrene in the rubber block portion is copolymerized and incorporated in a controlled distribution having terminal regions that are rich in diene units (e.g. butadiene, isoprene, or a mixture thereof) and a center region that is rich in styrene units. Such polymers were hydrogenated under standard conditions such that greater than 95% of the diene double bonds in the rubbery block have been reduced. The process for producing a selectively hydrogenated styrene block copolymer is described in U.S. Pat. No. 7,169,848 to Bening et al.

The styrene blockiness is simply the percentage of blocky styrene to total styrene units:

Blocky %=100 times (Blocky Styrene Units/Total Styrene Units)

Expressed thus, Polymer-Bd-S—(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10. In a preferred embodiment of the present invention, the subject controlled distribution copolymer block has two distinct types of regions—conjugated diene rich regions on the end of the block and a mono alkenyl arene rich region near the middle or center of the block. What is desired is a mono alkenyl arene-conjugated diene controlled distribution copolymer block, wherein the proportion of mono alkenyl arene units increases gradually to a maximum near the middle or center of the block and then decreases gradually until the polymer block is fully polymerized.

The alkenyl arene can be styrene, alpha-methylstryene, para-methylstyrene, vinyl toluene, vinylnaphthalene, or para-butyl styrene or mixtures thereof. Of these, styrene is most preferred and is commercially available, and relatively inexpensive, from a variety of manufacturers. The conjugated dienes for use herein comprise 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred.

For the controlled distribution or B block the weight percent of mono alkenyl arene in each B block is between about 10 weight percent and about 75 weight percent, preferably between about 25 weight percent and about 50 weight percent for selectively hydrogenated polymers.

It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene. It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5,000 to 45,000 for the A block and 50,000 to about 250,000 for the B block. For the triblock, which may be a sequential ABA or coupled $(AB)_2$ X block copolymer, the A blocks should be 3,000 to about 60,000 preferably 5,000 to about 45,000, while the B block for the sequential block should be about 30,000 to about 300,000 and the B blocks (two) for the coupled polymer half that amount. The total average molecular weight for the triblock copolymer should be from about 40,000 to about 400,000 and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

The controlled distribution block copolymer can be hydrogenated in various embodiments. One preferred hydrogenation is selective hydrogenation of the diene portions of the final block copolymer alternatively both the "B" blocks and the "A" blocks may be hydrogenated, or merely a portion of the "B" blocks may be hydrogenated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. No. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A, AND III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831. All of the patents mentioned in this paragraph are incorporated by reference into this application.

In various embodiments of the invention, the mono alkenyl arene is present in a total weight in an amount of greater than 20% and preferably greater than 35% based on the total weight of the controlled distribution block copolymer. In various embodiments the soft or B block of the controlled distribution copolymer block has a mono alkenyl arene content of less than 30%, desirably less than 29% by weight. The controlled distribution block copolymer of the present invention may include the copolymers sold under the trade name Kraton A® by Kraton Polymers, Kraton A1536 and A1535 are examples.

In various embodiments of the invention, when present, the controlled distribution block-containing styrenic block copolymers are utilized in sheath layer compositions of the present invention in an amount from about 5 to about 50 parts, desirably from about 10 or about 15 to about 50 parts, and preferably from about 10 to about 35 parts based on 100 parts by weight of the composition.

Other Thermoplastic Elastomers

Instead of or in addition to utilizing styrenic block copolymers, the thermoplastic elastomer of one or more of the inner sheath layer and outer sheath layer can be a thermoplastic polyolefin, thermoplastic polyurethane, thermoplastic copolyesters or thermoplastic polyamides.

Polyolefins

In one embodiment, one or more sheath layers of the present invention include one or more polyolefins, which as utilized herein are defined as one or more of a polyolefin polymer and a polyolefin copolymer, unless otherwise indicated. Polyolefins suitable for use in the compositions of the present invention comprise amorphous or crystalline homopolymers or copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, ethylene/α-olefin copolymer, propylene/α-olefin copolymers, and polybutene. Polyolefin copolymers can also include the greater part by weight of one or more olefin monomers and a lesser amount of one or more non-olefin monomers such as vinyl monomers including vinyl acetate, or a diene monomer, etc. Polar polyolefin polymers include ethylene acrylate and ethylene vinyl acetate, for example. In a preferred embodiment, EVA is utilized that has a vinyl acetate content of greater than 5 percent. Generally, a polyolefin copolymer includes less than 40 weight percent of a non-olefin monomer, desirably less than 30 weight percent, and preferably less than about 10 weight percent of, or does not contain a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride; acrylates such as glycidyl methacrylate; acid groups such as fumaric acid, itaconic acid, citraconic acid and acrylic acid; epoxy functional groups; and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefin polymers and copolymers are commercially available from sources including, but not limited to, Chevron, Dow Chemical, DuPont, ExxonMobil, Huntsman Polymers, Ticona and Westlake Polymer under various designations.

When present, the polyolefins range in an amount generally from about 0 to about 70 parts, desirably from about 5 to about 60 parts, and preferably from about 5 to about 50 parts by weight based on 100 total parts by weight of the total composition.

Other Polymers

In various embodiments, other polymers can be added to one or more sheath layer compositions of the present invention in amounts stated for the polyolefins, provided that such polymers do not interfere with the desired performance of the compositions and constructions formed therewith. Examples of additional polymers include, but are not limited to, polyamide such as nylon, acrylonitrile-butadiene-styrene copolymers (ABS), acrylonitrile ethylene styrene (AES), styrene acrylonitrile copolymer (SAN), halogenated polymers such as polyvinyl chloride, polycarbonates, acrylic polymers, PET, PBT, polyesters, TPU (including TPU with a bio based polyester block), polyether-block-amide (PEBA), polyphenylene ether (PPE), and polylactic acid (PLA). In one embodiment, the compositions of the present invention further include a polar polymer comprising one or more of ethylene vinyl acetate, maleated polyolefin, maleated styrenic block copolymer, maleated EPDM, acrylic polymer, and maleic anhydride/olefin copolymer, and wherein the polar polymer is present in an amount from about 1 to about 10 wt. % based on the total weight of the composition (100 wt. %).

Flame Retardants

At least one inner sheath layer or non-surface sheath layer of the covering includes at least one flame retardant. In preferred embodiments of the invention, the flame retardants utilized are halogen-free flame retardants. General classes or types of halogen-free flame retardants can be used for example, but not limited to, phosphorous-containing flame retardants, nitrogen-containing flame retardants, melamine derivatives, metal hydroxides, metal hydrates, expandable graphite and organo-layered silicates.

The phosphorous-containing flame retardants include phosphate esters. Phosphate esters include aromatic and aliphatic phosphate esters and their oligomers and polymers. Examples of aliphatic phosphate ester flame retardants include trimethyl phosphate, tributyl phosphate, tri(2-ethylhexyl) phosphate, tributoxyethyl phosphate, monoisodecyl phosphate and 2-acryloyloxyethylacid phosphate. Examples of aromatic phosphate esters include trixylenyl phosphate, tris (phenylphenyl) phosphate, trinaphthyl phosphate, cresyldiphenyl phosphate, xylenyl diphenyl phosphate, 2-ethylhexyl diphenyl phosphate, phosphoric acid dodecyl ester diphenyl ester, and dipheny-2-methacryloyloxyethyl phosphate. Examples of aromatic bis(phosphate esters) include resorcinol bis (diphenyl phosphate), resorcinol bis (dixylenyl phosphate), resorcinol bis(dicresylphosphate), hydroquinone bis (dixylenyl phosphate), bisphenol-A bis(diphenyl phosphate) and tetrakis (2,6-dimethylphenyl) 1,3-phenylene bisphosphate. Preferred phosphate esters in one embodiment include disphenyl-A bis(diphenyl phosphate), 2-ethylhexyl diphenyl phosphate, and resorcinol bis (diphenyl phosphate). The liquid, phosphorus-containing flame retardants are free of halogen atoms.

Phosphorous-containing flame retardants also include phosphates, pyrophosphates, metaphosphates and polyphosphates. Nitrogen and phosphorus-containing flame retardants include melamine phosphate, melamine pyrophosphate, melamine orthophosphate, monoammonium phosphate, diammonium phosphate, ammonium pyrophosphate, phosphoric acid amide, melamine polyphosphate, ammonium polyphosphate, piperazine polyphosphate, and polyphosphoric acid amide.

Other examples of halogen-free flame retardants include, for example metal hydrates such as aluminum hydrate and magnesium hydrate, metal hydroxides such as magnesium hydroxide and aluminum trihydroxide (ATH), metal oxides such as titanium dioxide, silica, alumina, bentonite clay, hectorite clay, montmorillonite clay, expandable graphite, huntite, antimony trioxide, potassium oxide, zirconium oxide, zinc oxide and magnesium oxide.

In some embodiments of the invention, the flame retardant packages described in U.S. Pat. No. 9,156,978 can be utilized, and the patent is herein incorporated by reference.

Phosphorous-containing flame retardants are available from sources such as Adeka Palmarole or Amfine Chemical Corporation (U.S.) as FP-600, FP-2100J, and FP-2200, and ICL-IP as Fyrol BDP. Polyphosphonate homopolymers and copolymers are available as FRX 100 and FRX CO35 from FRX Polymers. Various flame retardants are also available, such as Exolit from Clariant and Budit from Budenheim.

The amount of the halogen-free flame retardants can vary in the at least one inner sheath layer or non-surface sheath layer depending on the flame retardants utilized. When two or more inner sheath layers are present, the amounts of halogen-free flame retardants can vary independently per layer. The halogen-free flame retardants present in an inner sheath layer are present in an amount generally from about 5 to about 70 parts, desirably from about 10 to about 65 parts and preferably from about 15 to about 60 parts based on 100 total parts by weight of the components used to form the layer.

Additives

The sheath layers of the present invention may include additional additives including, but not limited to light stabilizers antioxidants, other non-halogen flame retardant additives (inner sheath layers), pigments, peroxides, heat stabilizers, processing aids, mold release agents, flow enhancing agents, nanoparticles, foam agents, platelet fillers and non-platelet fillers. Examples of fillers for use in the compositions include, but are not limited to, one or more of calcium carbonate, talc, zeolite, titanium dioxide, carbon black, barium sulfate, mica, glass fibers, whiskers, carbon fibers, magnesium carbonate, glass powders, metal powders, kaolin, graphite, and molybdenum disulfide. Suitable fillers include bio-based fillers, e.g. various fibers, cellulose, and/or lignin.

Softener

In various embodiments, one or more sheath layers of the present invention include a softener that, as utilized herein, refers to a mineral oil, synthetic resin softener and vegetable oil. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". Examples of synthetic resin softeners include, but are not limited to, poly(alpha olefin) oligomers (PAO), polyisobutylene, polybutenes and GTL oil, available from Shell. When present, the softeners range in an amount from 1 to 40 wt. %, and preferably from 5 to 30 wt. % based on the total weight of the respective sheath layer composition.

EXAMPLES

The examples set forth below are provided to illustrate the features of the cables and covering layers of the present invention. The examples are not intended to limit the scope of the invention.

The materials used in coextrusion were dried at 80° C. for 2-4 hours prior to extrusion. The outer and inner layers were extruded between 190° C.-230° C. The thicknesses of the layers were varied and samples were collected for surface quality analysis, VW-1 test, and weathering testing.

The following raw materials were utilized for the examples.

| | |
|---|---|
| Outer sheath 1 | MP-2979A from Teknor Apex |
| Inner sheath 1 | CE-23945D from Teknor Apex |
| Inner sheath 2 | CE-23950D from Teknor Apex |
| Inner sheath 3 | CE-12390 from Teknor Apex |

Following test protocols were used for testing.

| Test | Units | Test Method |
|---|---|---|
| UL 94 VB Test | V-0 Pass/Fail | UL 94 |
| VW-1 flame Test | VW-1 Pass/Fail | UL-1581, section 1080 |
| Weathering Test | ΔE, 150 KJ/m$^2$ | SAEJ2412 |
| Chemical Resistance | % Change in Tensile Elongation/Break | Procedure described above, ASTM-D412 |
| Specific Gravity | | ASTM D792 |
| Durometer Hardness (5-s) | Shore | ASTM D2240 |

Outer sheath 1 comprised a styrenic block copolymer, polypropylene, an ethylene-propylene copolymer, a softener and additives. The outer sheath 1 was free of flame retardants. The inner sheaths 1, 2 and 3 each contained a styrenic block copolymer having a controlled distribution soft block including vinyl alkenyl arene units, polypropylene and EVA. Flame retardants were phosphorous-containing flame retardants and melamine-containing flame retardants including piperazine pyrophosphate and melamine pyrophosphate.

TABLE 1

| Tests | Outer Sheath 1 | Inner Sheath 1 | Inner Sheath 2 | Inner Sheath 3 |
|---|---|---|---|---|
| Specific Gravity | 0.91 | 1.2 | 1.21 | 1.22 |
| Durometer Hardness (5-s) | 80A | 45D | 50D | 47D |
| UL 94 VB TEST | Fail (No rating) | V-0 @ 1.058 mm (1/24 in) | V-0 @ 1.058 mm (1/24 in) | V-0 @ 1.058 mm (1/24 in) |

Table 1 illustrates basic properties of the compositions utilized to form the outer and inner sheaths. Each of the inner sheaths attained a V-0 rating @ 1.058 mm (1/24 in) according to the UL 94 VB test. The outer sheath failed to achieve a rating according to UL 94.

TABLE 2

Chemical Resistance

| Tests | Units | Outer Sheath 1 | % Change | Inner Sheath 2 | % Change | Inner Sheath 3 | % Change |
|---|---|---|---|---|---|---|---|
| | | No Heat Exposure | | | | | |
| Tensile Elongation (Break) | % | 661 | N/A | 248 | N/A | 289 | N/A |
| | | Heat exposure conditions - 65° C./72 h | | | | | |
| Tensile Elongation (Break) | % | 701.5 | 6.1 | 240 | -3.2 | 266 | -8.0 |

TABLE 2-continued

Chemical Resistance

| Tests | Units | Outer Sheath 1 | % Change | Inner Sheath 2 | % Change | Inner Sheath 3 | % Change |
|---|---|---|---|---|---|---|---|
| Chemical Resistance exposure conditions - 65° C./72 h Sebum Oil ||||||||
| Tensile Elongation (Break) | % | 657.0 | −6.3 | 303 | 26.3 | 305 | 14.7 |

Table 2 provides tensile elongation values for the tested sheaths 1) with and 2) without heat exposure. The sheath compositions were tested for chemical resistance and compared to the tensile elongation values obtained for sheath compositions subjected to the heat exposure conditions. Low percent changes in elongation are desirable. The data shows that the outer sheath composition has much better average chemical resistance than each of the inner sheath compositions as judged by the change in elongation at break. The % elongation results indicate that the inner sheath compositions swelled significantly when exposed to sebum oil. This indicates poor chemical resistance. Comparatively, significant swelling was not observed with the outer sheath composition. The outer sheath composition exhibited less than seven percent change in elongation at break values. Hence, when used as an outer sheath in the cable construction, chemical resistance of the cable as a whole is much improved compared to cable made with FR jacket compound.

TABLE 3

Cable Constructions

| Example | Sample Description | % Thickness - Outer Layer | VW-1 Result |
|---|---|---|---|
| 1 | Outer sheath 1 (0.05 mm), Inner sheath 2 (0.53 mm) | 9.1 | Pass |
| 2 | Outer sheath 1 (0.043 mm), Inner sheath 2 (0.71 mm) | 5.7 | Pass |
| 3 | Outer sheath 1 (0.06 mm), Inner sheath 2 (0.75 mm) | 7.3 | Pass |
| 4 | Outer sheath 1 (0.06 mm), Inner sheath 1 (0.69 mm) | 8 | Pass |
| 5 | Outer sheath 1 (0.045 mm), Inner sheath 1 (0.78 mm) | 5.4 | Pass |
| 6 | Outer sheath 1 (0.046 mm), Inner sheath 1 (0.51 mm) | 8.3 | Pass |
| 7 | Outer sheath 1 (0.054 mm), Inner sheath 3 (0.545 mm) | 9 | Pass |

Table 3 illustrates all constructions having an outer layer without flame retardants achieved a VW-1 rating at various percentages of thickness for the outer sheath.

TABLE 4

Weathering Test

| Weathering Test | Outer Sheath 1 | Inner Sheath 1 | Inner Sheath 2 |
|---|---|---|---|
| ΔE, 150 KJ/m² | 1.425 | 8.3 | 12.7 |

According to Table 4, the outer sheath 1 composition exhibited much better weathering resistance as compared to compositions for inner sheath layer 1 and inner sheath layer 2. Thus, color shift is much less for the outer sheath 1 composition and more desirable from an appearance standpoint for the end user. Similar results were obtained when cables were tested for weathering resistance. Cables with outer non-FR layer had very little color shift whereas cables with outer layer of FR-TPE showed significant yellowness and increase in tack.

For the avoidance of doubt, the compositions of the present invention encompass all possible combinations of the components, including various ranges of said components, disclosed herein. It is further noted that the term "comprising" does not exclude the presence of other elements. However, it is to also be understood that a description of a product or composition comprising certain components also discloses a product consisting of said components. Similarly, it is also to be understood that a description of a process comprising certain steps also discloses a process consisting of the steps.

While in accordance with the patent statutes the best mode and preferred embodiment have been set forth, the scope of the invention is not limited thereto, but rather by the scope of the attached claims.

What is claimed is:

1. A cable with a flame retardant covering, comprising:
a core comprising at least one wire;
an inner sheath layer surrounding the core, the inner sheath layer consisting of a first thermoplastic elastomer comprising a styrenic block copolymer having an alkenyl arene-based block and a controlled distribution block derived from diene and vinyl alkenyl arene units; a polyolefin; and at least one flame retardant, wherein the at least one flame retardant comprises one or more of i) a phosphorous-containing flame retardant, ii) a nitrogen-containing flame retardant, iii) a melamine derivative and iv) a nitrogen and phosphorous-containing flame retardant; and
an outer sheath layer surrounding the inner sheath layer, the outer sheath layer consisting of a second thermoplastic elastomer comprising a styrenic block copolymer; a polyolefin; and a softener and being essentially free of flame retardants, wherein the cable passes a VW-1 flame test according to UL 1581, section 1080, and wherein the outer sheath layer has a Durometer hardness (5-s) that is less than that of the inner sheath layer as measured according to ASTM D2240.

2. The cable according to claim 1, wherein the at least one flame retardant is halogen-free.

3. The cable according to claim 2, wherein the composition utilized to form the outer sheath layer has a weatherability of less than 8 ΔE, 150 KJ/m² as measured according to SAE J2412.

4. The cable according to claim 1, wherein the outer sheath layer has a thickness that ranges from about 0.5 percent to about 30 percent based on the total thickness of the inner sheath layer and the outer sheath layer.

5. The cable according to claim 1, wherein the composition used to form the inner sheath layer passes the UL 94 VB test with a V-0 rating at a thickness of 3.175 mm (⅛ in), and wherein the composition used to form the the outer sheath layer fails the UL 94 VB test at a thickness of less than or equal to 3.175 mm (⅛ in).

6. The cable according to claim 1, wherein the at least one flame retardant is present in an amount from about 5 to about 70 parts based on 100 total parts by weight of the components of the inner sheath layer.

7. The cable according to claim 6, wherein the phosphorous-containing flame retardant is one or more of a phosphate ester, a phosphate, a pyrophosphate, a metaphosphate and a polyphosphate, wherein the nitrogen and phosphorous-containing flame retardant is one or more of melamine phosphate, melamine pyrophosphate, melamine orthophosphate, monoammonium phosphate, diammonium phosphate, ammonium pyrophosphate, phosphoric acid amide, melamine polyphosphate, ammonium polyphosphate, piperazine polyphosphate, and polyphosphoric acid amide.

8. The cable according to claim 7, wherein the at least one flame retardant comprises piperazine, pyrophosphate and melamine pyrophosphate.

9. The cable according to claim 8, wherein the flame retardants are present in the inner sheath layer in an amount from about 15 parts to about 60 parts based on 100 total parts by weight of the components of the inner sheath layer.

10. The cable according to claim 1, wherein the outer sheath layer has a Durometer hardness (5-s) of 80 Shore A and the inner sheath layer has a Durometer hardness of 45 D to 50 D as measured according to ASTM D2240.

11. The cable according to claim 1, wherein the styrenic block copolymer is a styrenic tri-block copolymer comprising a controlled distribution copolymer midblock having a conjugated diene and a mono alkenyl arene, wherein the controlled distribution copolymer midblock comprises a) terminal regions being rich in conjugated dienes and b) a central region between the terminal regions rich in mono alkenyl arene units.

12. A cable with a halogen-free flame retardant covering, comprising:
a core comprising at least one wire;
an inner sheath layer surrounding the core, the inner sheath layer consisting of a first thermoplastic elastomer comprising a styrenic block copolymer having an alkenyl arene-based block and a controlled distribution block derived from diene and vinyl alkenyl arene units; a polyolefin; and at least one flame retardant, wherein the at least one flame retardant comprises one or more of i) a phosphorous-containing flame retardant, ii) a nitrogen-containing flame retardant, iii) a melamine derivative and iv) a nitrogen and phosphorous-containing flame retardant; and
an outer sheath layer surrounding the inner sheath layer, the outer sheath layer consisting of a second thermoplastic elastomer comprising a styrenic block copolymer; a polyolefin; and a softener and being essentially free of flame retardants, wherein the outer sheath has a weatherability of less than 8 $\Delta E$ at 150 $KJ/m^2$ as measured according to SAE J2412,
wherein the outer sheath layer has a Durometer hardness (5-s) that is less than that of the inner sheath layer as measured according to ASTM D2240.

13. The cable according to claim 12, wherein the at least one flame retardant is halogen-free.

14. The cable according to claim 13, wherein the outer sheath layer has a thickness that ranges from about 0.5 percent to about 30 percent based on the total thickness of the inner sheath layer and the outer sheath layer.

15. The cable according to claim 14, wherein the composition used to form the inner sheath layer passes the UL 94 VB test with a V-0 rating at a thickness of 3.175 mm (⅛ in), and wherein the composition used to form the outer sheath layer fails the UL 94 VB test at a thickness of less than or equal to 3.175 mm (⅛ in).

16. The cable according to claim 12, wherein the at least one flame retardant is present in an amount from about 5 to about 70 parts based on 100 total parts by weight of the components of the inner sheath layer.

17. The cable according to claim 16, wherein the phosphorous-containing flame retardant is one or more of a phosphate ester, a phosphate, a pyrophosphate, a metaphosphate and a polyphosphate, wherein the nitrogen and phosphorous-containing flame retardant is one or more of melamine phosphate, melamine pyrophosphate, melamine orthophosphate, monoammonium phosphate, diammonium phosphate, ammonium pyrophosphate, phosphoric acid amide, melamine polyphosphate, ammonium polyphosphate, piperazine polyphosphate, and polyphosphoric acid amide.

18. The cable according to claim 17, wherein the at least one flame retardant comprises piperazine, pyrophosphate and melamine pyrophosphate.

19. The cable according to claim 18, wherein the flame retardants are present in the inner sheath layer in an amount from about 15 parts to about 60 parts based on 100 total parts by weight of the components of the inner sheath layer.

* * * * *